Sept. 9, 1924.
H. TEWES
REGISTER
Original Filed Nov. 11, 1922  2 Sheets-Sheet 1
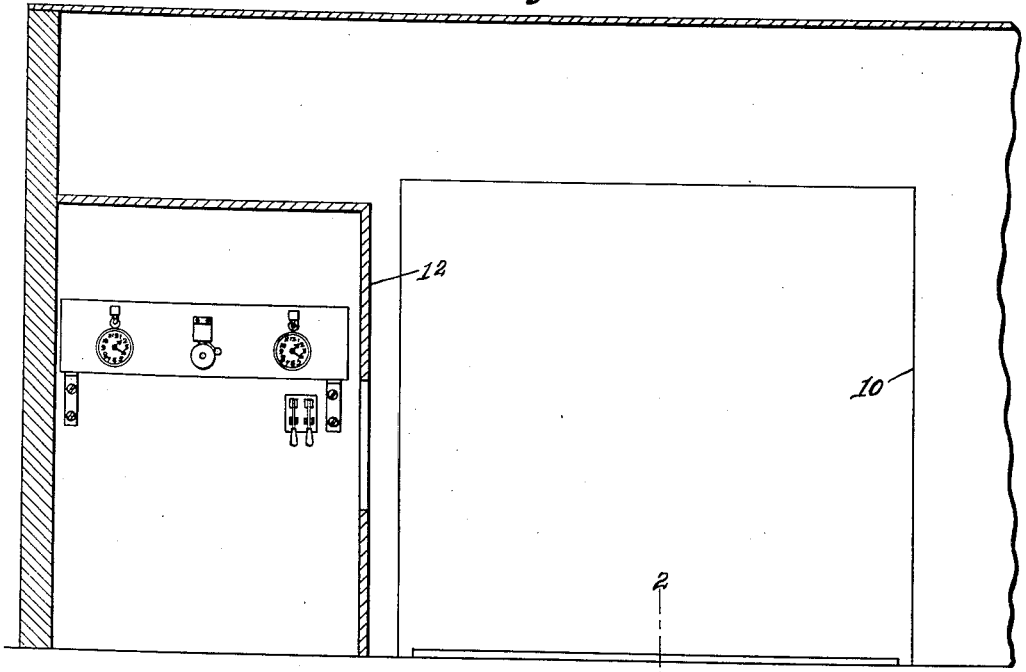
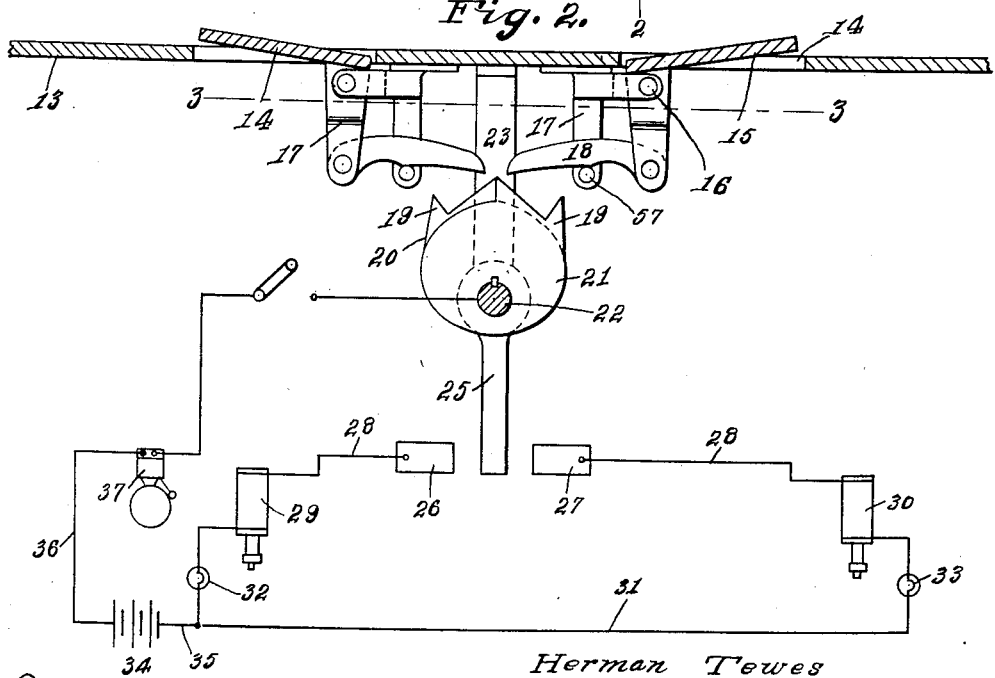
Herman Tewes
INVENTOR
BY *Victor J. Evans*
ATTORNEY
WITNESS:

Sept. 9, 1924.
H. TEWES
REGISTER
Original Filed Nov. 11, 1922   2 Sheets-Sheet 2
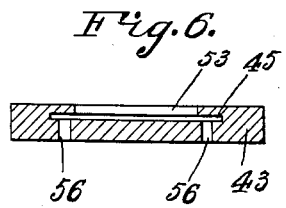
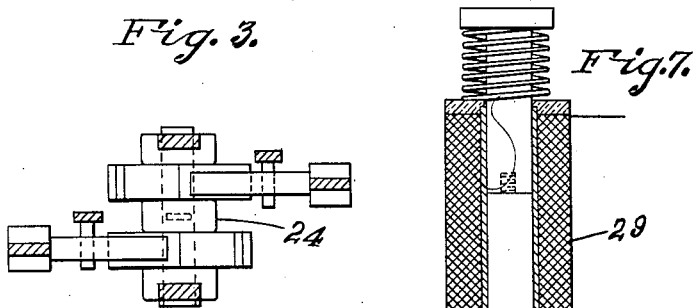
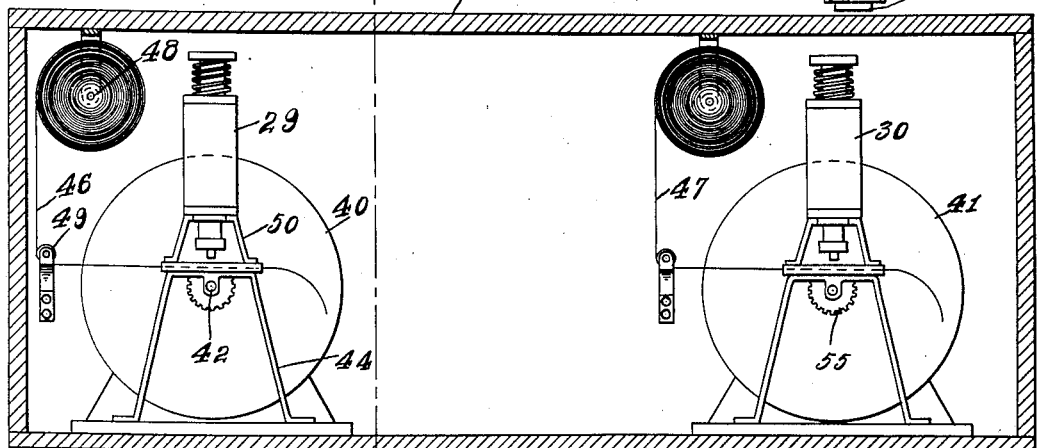
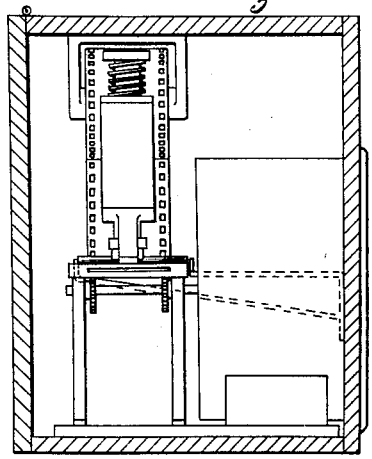
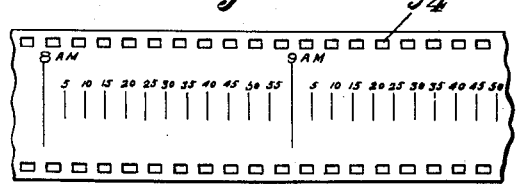
Herman Tewes
INVENTOR
BY Victor J. Evans
ATTORNEY
WITNESS:

Patented Sept. 9, 1924.

1,507,801

UNITED STATES PATENT OFFICE.

HERMAN TEWES, OF HICKSVILLE, NEW YORK.

REGISTER.

Application filed November 11, 1922, Serial No. 600,333. Renewed June 11, 1924.

*To all whom it may concern:*

Be it known that I, HERMAN TEWES, a citizen of the United States, residing at Hicksville, in the county of Nassau and State of New York, have invented new and useful Improvements in Registers, of which the following is a specification.

This invention relates to indicating and recording devices and has for an object the provision of means for indicating and recording the passage of vehicles past a given point and the direction of travel of said vehicles, the invention being especially useful for indicating and recording the passage of automobiles into and out of a garage.

Another object of the invention is the provision of a device which includes the above and other advantageous features, which is simple in construction, positive in operation and by means of which a permanent record of the passage of vehicles as above set forth, may be kept.

With the above and other objects in view, the invention further includes the following novel features and details of construction, to be hereinafter more fully described, illustrated in the accompanying drawings and pointed out in the appended claims.

In the drawings:—

Figure 1 is a fragmentary sectional view showing a portion of a building with which the invention may be used.

Figure 2 is an enlarged section taken substantially on the line indicated at 2—2 in Figure 1, the view showing the electric devices and their connections diagrammatically.

Figure 3 is a section on the line 3—3 of Figure 2.

Figure 4 is an enlarged sectional view showing the recording mechanism.

Figure 5 is a section on the line 5—5 of Figure 4.

Figure 6 is an enlarged transverse sectional view through the guide for the recording tape.

Figure 7 is a sectional view of the stamping device.

Figure 8 is a fragmentary plan view of the recording tape.

In illustrating the invention, the same is shown in connection with a building such as a garage, the door or entrance of which is indicated at 10, while the recording and indicating mechanisms which are indicated generally at 11 are shown as located within an office or other enclosure 12, although it is obvious that they may be located in any desired place.

The floor of the building is indicated at 13 and this floor adjacent the threshold of the door 10 is provided with openings 14. Located within these openings and normally disposed above the surface of the floor 13 are treads 14 and 15, the said treads being pivotally mounted as shown at 16 upon brackets 17 located beneath the floor. The treads 14 and 15 have secured thereto arms 17, the pivot 16 extending through these arms, while pivotally connected to the lower ends of the arms 17 are dogs 18. These dogs are adapted to engage teeth 19 of eccentrically mounted members 20 and 21, the said members being secured upon a shaft 22 which is mounted in suitable bearings 23. The eccentric members 20 and 21 are spaced apart by a collar 24 which has extending downwardly a switch arm 25.

The arm 25 is located between and normally spaced from spaced contacts 26 and 27, which are connected by means of conductor 28 with solenoids 29 and 30. The solenoids are connected to one another by a conductor 31 in which is included lamps 32 and 33, the conductor 31 being connected to one side of a battery 34 by means of a conductor 35. A conductor 36 connects the opposite side of the battery 34 to the shaft 22 and included in this last mentioned conductor is a bell or other audible signal 37 and a switch 38.

Located within a cabinet or other enclosure 39 are time mechanisms 40 and 41, whose faces preferably extend through the face of the cabinet 39 as shown in Figure 1, so as to be plainly visible. Connected to the minute arbors of the time mechanisms 40 and 41 are shafts 42, the latter being mounted in suitable bearings located beneath guide tables 43. The tables 43 are mounted upon suitable brackets 44 and are provided with horizontally arranged guide grooves 45 for the passage of tapes 46 and 47. The tapes 46 and 47 are mounted upon reels 48 and pass beneath guide rollers 49 positioned between said reels and the tables 43. The solenoids 29 and 30 are mounted upon brackets 50 positioned above the tables 43 and carry suitable stamping elements 51 having ink reservoirs 52, the said stamping elements 51 passing downward into openings 53 provided in the tapes of the tables 43 so as to engage the tapes 46 and 47.

The tapes 46 and 47 are of a similar character and as indicated in Figure 8 of the drawings are divided into hours and fractions thereof and are provided adjacent their opposite edges with spaced openings 54 for engagement by the teeth of spaced gears 55 which are secured upon the shafts 42 and which extend upward through slots 56 provided in the tables 43, the upper ends of these slots communicating with the guide slots 45.

Normally, the parts occupy the position shown in Figure 2 of the drawings, that is, with the switch arm 25 located substantially centrally between and out of engagement with the contacts 26 and 27. The dogs 18 are normally held above the path of movement of the teeth 19 by pins 57 which are located at the ends of the brackets 18 and upon which the dogs ride.

An automobile or other vehicle entering the garage will depress one of the treads above mentioned, for example, the tread 14, so as to force the same downward upon its pivot 16. The dog 18 will then ride over the pin 57 and its free end will descend due to the shape of the lower edge of the dog. The free end of the dog will then engage the first tooth 19 of the eccentric member 21 and the latter will be pivotally moved to cause the switch arm 25 to engage the contact member 26. A circuit will then be closed through the switch arm 25, the contact 26, the conductor 28, the solenoid 29, the lamp 32, the conductor 35, the battery 34, the conductor 36, the bell 37, the switch 38 and the shaft 22 to the switch arm 25. The solenoid 29 will then be energized to cause the stamping element 51 to move downward and engage the tape 46, the latter passing through the guide 45 of one of the tables 43 under the influence of the time mechanism 40. The time at which the tread 14 is depressed will thus be recorded upon the tape 46 and the bell 37 sounded and the lamp 32 lighted, which lamp may be of a distinguishing color if desired.

Further passage of the vehicle will cause the other tread 15 to be depressed and as the shaft 22 is yieldingly and frictionally held against movement, the dog 18 of the tread 15 will engage the second tooth of the eccentric member 20, which has been moved into position for such engagement by the operation of the tread 14. This will return the switch arm 25 to its normal position so as to open the circuit.

A vehicle travelling in an opposite direction will operate the device in the manner just described, except that the tread 15 will be first depressed which will cause a circuit to be closed through the solenoid 30 so as to record the depression of the tread 15 upon the plate 47 and at the same time light the lamp 33 and ring the bell 37. As the lamp 33 will preferably be of a different color from the lamp 32, the device will indicate that the vehicle depressing the tread is passing out.

The invention is susceptible of various changes in its form, proportions and minor details of construction and the right is herein reserved to make such changes as properly fall within the scope of the appended claims.

Having described the invention what is claimed is:—

1. A device of the character described comprising a pair of depressible treads normally disposed above the surface of a floor or roadway, a time operated tape divided into hours and fractions thereof, an electrically operated recording device positioned to engage the tape, a switch included in circuit with the recording device, means whereby depression of one of the treads will close the circuit and means whereby depression of the other tread will operate the switch to open the circuit.

2. The combination with a pair of spaced independently movable treads, of separate electrically operated signal devices, a switch, means controlled by the operation of the treads to close the switch and selectively operate the signal devices and means also controlled by the operation of the treads to return the parts to normal position.

3. The combination with a pair of spaced independently movable treads adapted to be successively depressed by the passage of a vehicle, of a plurality of electrically operated devices included in separate electric circuits, a normally open switch common to each of said circuits, means operated by the treads and controlled by the direction of travel of a vehicle to selectively close one of the circuits and means whereby the tread operated means will restore the switch to open position.

4. The combination with a pair of spaced independently movable treads adapted to be successively depressed by the passage of a vehicle, of a plurality of electrically operated devices included in separate electric circuits, a normally open switch common to each of said circuits, means including pivotally mounted toothed members operated by the treads and controlled by the direction of travel of a vehicle to selectively close one of the circuits and means whereby the tread operated means will restore the switch to normal position.

In testimony whereof I affix my signature.

HERMAN TEWES.